United States Patent [19]

Christophorou et al.

[11] 4,309,307

[45] * Jan. 5, 1982

[54] GAS MIXTURES FOR GAS-FILLED RADIATION DETECTORS

[75] Inventors: Loucas G. Christophorou, Oak Ridge; Dennis L. McCorkle, Knoxville; David V. Maxey, Knoxville; James G. Carter, Knoxville, all of Tenn.

[73] Assignee: The United States of America as represented by the United States Department of Energy, Washington, D.C.

[ * ] Notice: The portion of the term of this patent subsequent to May 6, 1997, has been disclaimed.

[21] Appl. No.: 134,815

[22] Filed: Mar. 28, 1980

Related U.S. Application Data

[63] Continuation-in-part of Ser. No. 5,263, Jan. 22, 1979, Pat. No. 4,201,692.

[51] Int. Cl.³ .......................... C09K 3/00; H01J 39/28; H01J 39/30

[52] U.S. Cl. ..................................... 252/372; 250/374

[58] Field of Search ......................................... 252/372

[56] References Cited

U.S. PATENT DOCUMENTS 4,201,692 5/1980 Christophorou et al. .......... 252/372

OTHER PUBLICATIONS

Breyer, Nuclear Inst. and Meth. 112, pp. 91–93, 1933.

Moe et al., J. Phys. Chem. 61, 422–425, 1957.

Alkhazov et al., Nuclear Inst. & Methods 48, pp. 1–12, 1967.

Olson, J. Chem. Phys. 39, No. 11, 1963, pp. 2902–2908.

Illin, Chem. Abst. 84 163859k, 1976.

Kocharov, Chem. Abst. 55 26725b, 1961.

*Primary Examiner*—Howard T. Mars

*Attorney, Agent, or Firm*—Stephen D. Hamel; Richard G. Besha; James E. Denny

[57] ABSTRACT

Improved binary and ternary gas mixtures for gas-filled radiation detectors are provided. The components are chosen on the basis of the principle that the first component is one molecular gas or mixture of two molecular gases having a large electron scattering cross section at energies of about 0.5 eV and higher, and the second component is a noble gas having a very small cross section at and below about 1.0 eV, whereby fast electrons in the gaseous mixture are slowed into the energy range of about 0.5 eV where the cross section for the mixture is small and hence the electron mean free path is large. The reduction in both the cross section and the electron energy results in an increase in the drift velocity of the electrons in the gas mixtures over that for the separate components for a range of E/P (pressure-reduced electric field) values. Several gas mixtures are provided that provide faster response in gas-filled detectors for convenient E/P ranges as compared with conventional gas mixtures.

1 Claim, 8 Drawing Figures

GAS MIXTURES FOR GAS-FILLED RADIATION DETECTORS

This invention is the result of a contract with the U.S. Department of Energy.

This application is a continuation-in-part to application Ser. No. 5,263, filed Jan. 22, 1979 now U.S. Pat. No. 4,201,692.

BACKGROUND OF THE INVENTION

Gas-filled detectors have been used extensively in radiation detection and dosimetry. Such detectors have been used to measure various particles such as alpha-particles, neutrons, fission fragments, etc.; others have been used for measuring electromagnetic radiation, e.g., X- and gamma rays. In such detectors the ionizing radiation interacts with the counter gas to produce electrons, and ions by ionization, the electrons then being drawn to a collector at positive voltage thereby generating a signal that may be related to some characteristic (e.g., energy) of the radiation. Some of the desirable characteristics of the detector are: speed of electron collection which affects the time resolution and spatial resolution for position sensitive detectors, total charge transfer which affects the pulse height of the output signal, and energy resolution which affects identification of specific radiations.

In recent years the most commonly used filling gas for particle detectors is a 90% Ar-10% $CH_4$ (methane) mixture which is designated as P-10. The most common counter gases for electromagnetic radiation are 90% Xe-10% $CH_4$ or b 90% Xe-10% $CO_2$. Currently, these gases are standards against which other gases are evaluated. However, these gases have certain deficiencies. For example, the electron drift velocities are high over only a very narrow E/P (pressure-reduced electric field) range thus putting constraints on the pressure and the collection voltage, and the maximum drift velocities are limiting for some applications.

Thus, there exists a need for providing improved and more efficient gas mixtures for gas-filled radiation detectors. The present invention was conceived to meet this need in a manner to be described hereinbelow.

SUMMARY OF THE INVENTION

It is the object of the present invention to provide improved gas mixtures for gas-filled radiation detectors wherein faster response can be achieved therefrom.

The above object has been accomplished in the present invention by mixing an appropriate noble gas with a molecular gas or mixture of molecular gases having a high electron scattering cross section at energies equal to or greater than about 0.5 eV and a small electron scattering cross section at and below about 0.5 eV, selected from $CF_4$ and $C_2H_2$, or a combination thereof at desired concentrations with respect to the noble gas (the major component) in a manner to be described hereinbelow.

DESCRIPTION OF THE PREFERRED EMBODIMENTS

As pointed out above, a desired essential characteristic of a counting gas is a fast electron drift velocity, i.e., a desired characteristic of a counter is high speed. This is a function of the gas pressure and the collecting voltage. It is also a function of the electron scattering cross section of, and the electron mean free path in, the gas. It was conceived in the present invention that if one molecular gas or a mixture of molecular gases having a large scattering cross section above about 0.5 eV and a relatively small scattering cross section at and below this energy was mixed with one having a low cross section below about 1.0 eV in proportions where the cross section of the mixture is low, a faster charge collection would result.

The criterion for the high cross section is met by the simple gases $CF_4$ (carbon tetrafluoride) and $C_2H_2$ (acetylene); the low cross section component for particle detectors is argon. Accordingly, mixtures of Ar with $CF_4$ and $C_2H_2$ were prepared and the drift velocity of each measured by conventional techniques. The temperature was 298 K, and the total gas pressure was 500 torr. The results of these tests, together with data on prior art gas mixtures, are plotted in FIGS. 1–3 of the drawings.

Figure 1:
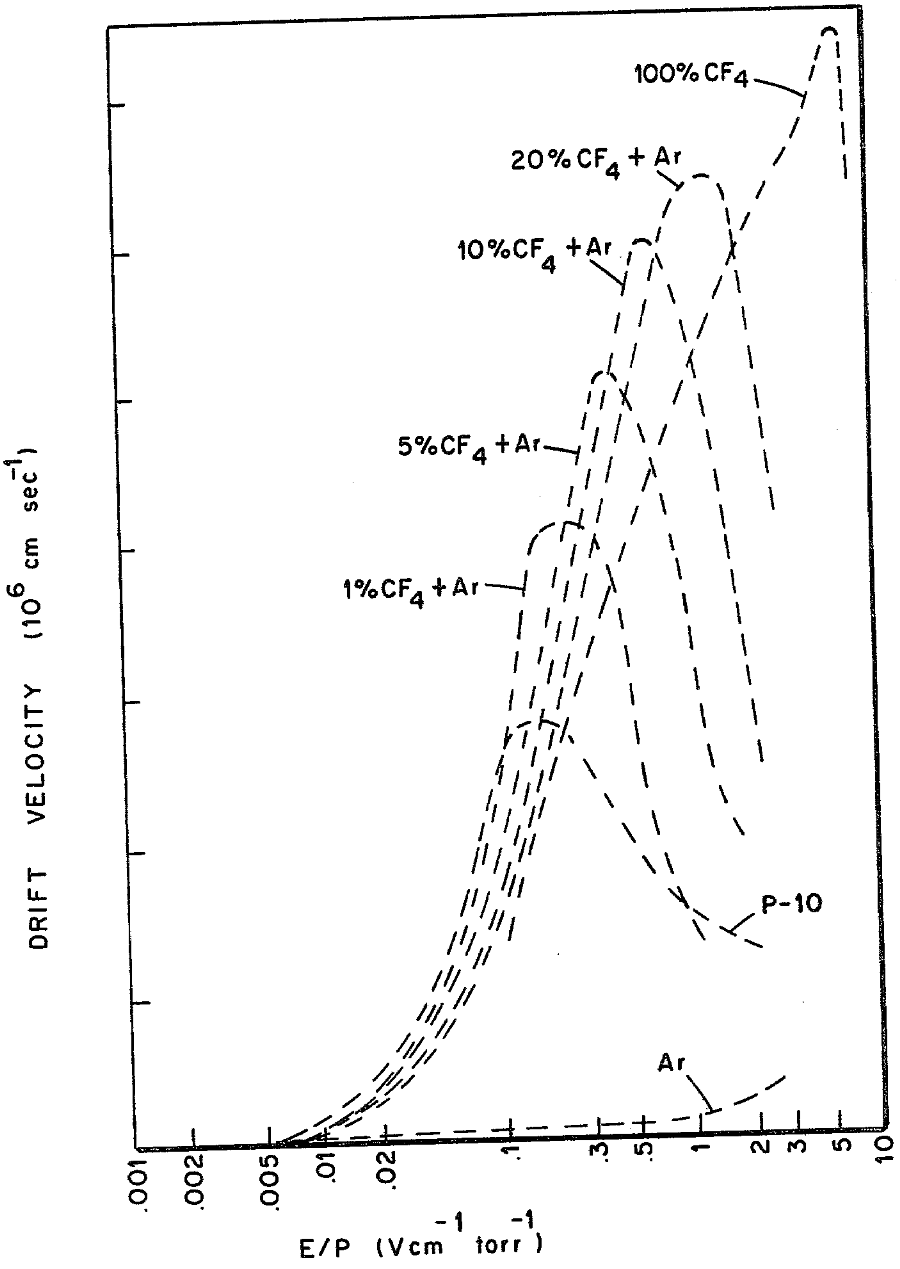
FIG. 1 is a plot of the drift velocity, as a function of E/P, for various gas mixtures showing the superiority of Ar-$CF_4$ mixtures over a P-10 mixture as a particle detector counter gas.

Referring first to FIG. 1, a reference curve for P-10 gas (90% Ar-10% methane) is shown as well as the Ar drift velocity. The maximum drift velocity of P-10 occurs in an E/P range of 0.1 to 0.3 (V $cm^{-1}$ $torr^{-1}$), with the drift velocity decreasing substantially outside of that range. The addition of as little as 1% $CF_4$ to Ar increases the drift velocity about 50% above that of P-10 and further enhancement is effected by 5%, 10% and 20% $CF_4$ to Ar. The percentage enhancement is smaller as additional $CF_4$ is added up to 100%.

The range of maximum drift velocities for each of these mixtures is shifted to higher E/P values with increasing $CF_4$ concentration. Accordingly, a user may select a composition for a desired maximum drift velocity and then operate at the appropriate E/P value for that maximum. Alternatively, if a specific E/P condition is required, several composition choices are available to achieve a drift velocity at least as large as that of P-10.

Figure 2:
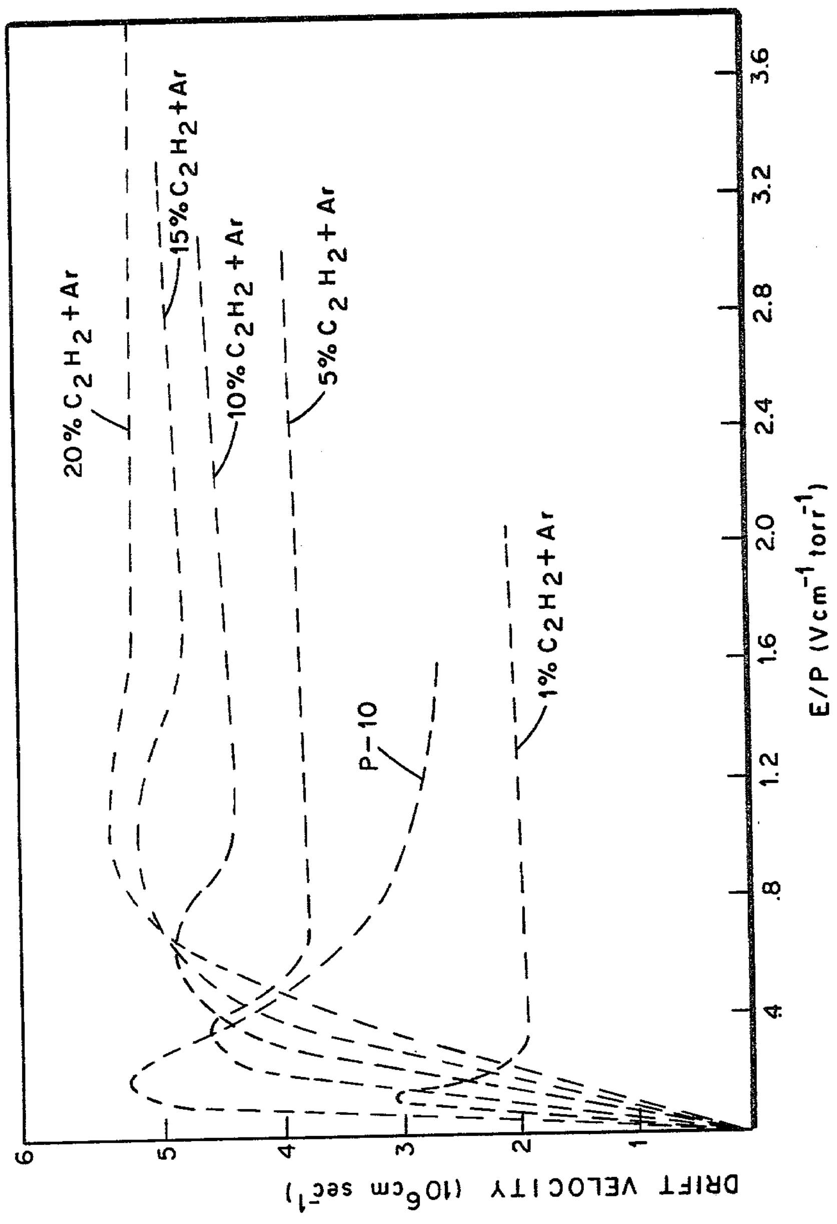
FIG. 2 is a similar plot comparing a P-10 mixture and Ar—$C_2H_2$ mixtures.

The results for Ar—$C_2H_2$ mixtures are plotted in FIG. 2 where they are contrasted with P-10 gas. The pattern of the results differs from those of the Ar—$CF_4$ mixtures in that an increasing content of $C_2H_2$ gives rise to a drift velocity approximately equaling the maximum for P-10. However, the drift velocity value is nearly constant for any E/P value from about 0.5 to 4 (V $cm^{-1}$ $torr^{-1}$). Thus, for E/P values in this range a relatively high drift velocity can be obtained with 5% $C_2H_2$. In a range of 10—20% $C_2H_2$, the maximum drift velocity is very near that of the P-10 mixture. When 1% $C_2H_2$ is added to Ar, the only advantage achieved is a constant drift velocity over a wide E/P range (above about 0.3 V $cm^{-1}$ $torr^{-1}$). For concentrations of $C_2H_2$ greater than 20% in Ar, only a slight increase in drift velocity is obtained which begins at E/P greater than about 1.3 V $cm^{-1}$ $torr^{-1}$.

The performance of $CF_4$—Ar and $C_2H_2$—Ar mixtures has each been investigated in a conventional proportional counter using as a source gamma-rays from $^{55}Fe$. The proportional counter resolution for several concentrations of $CF_4$ or $C_2H_2$ in Ar was measured for a number of voltages applied to the anode (central wire). The percent energy resolution is defined as the full width at half maximum of the peak divided by the position in energy of the peak. For a 10% $CF_4$-90% Ar mixture, the percent resolution is approximately three to four times greater than that for the P-10 mixture. This poorer resolution for the $CF_4$—Ar mixtures is due to the fact that $CF_4$ attaches electrons, probably by dissociative electron attachment of $CF_4$ producing $F^-$. The percent resolution for $C_2H_2$—Ar mixtures, on the other hand, is approximately the same (and it could, in fact, be better) as that for P-10 mixtures up to 30% $C_2H_2$ in Ar.

From the above discussion it can be seen that $CF_4$-Ar mixtures have the advantage of enhanced drift velocity but at the expense of energy resolutions, and $C_2H_2$—Ar mixtures have drift velocities slightly greater than those for P-10 mixtures (but over a wider E/P range) and no appreciable change in energy resolution with respect to P-10 mixtures. Thus, it was conceived that both advantages of $CF_4$ and $C_2H_2$ as additions to Ar could be realized in ternary gas mixtures.

Figure 3:
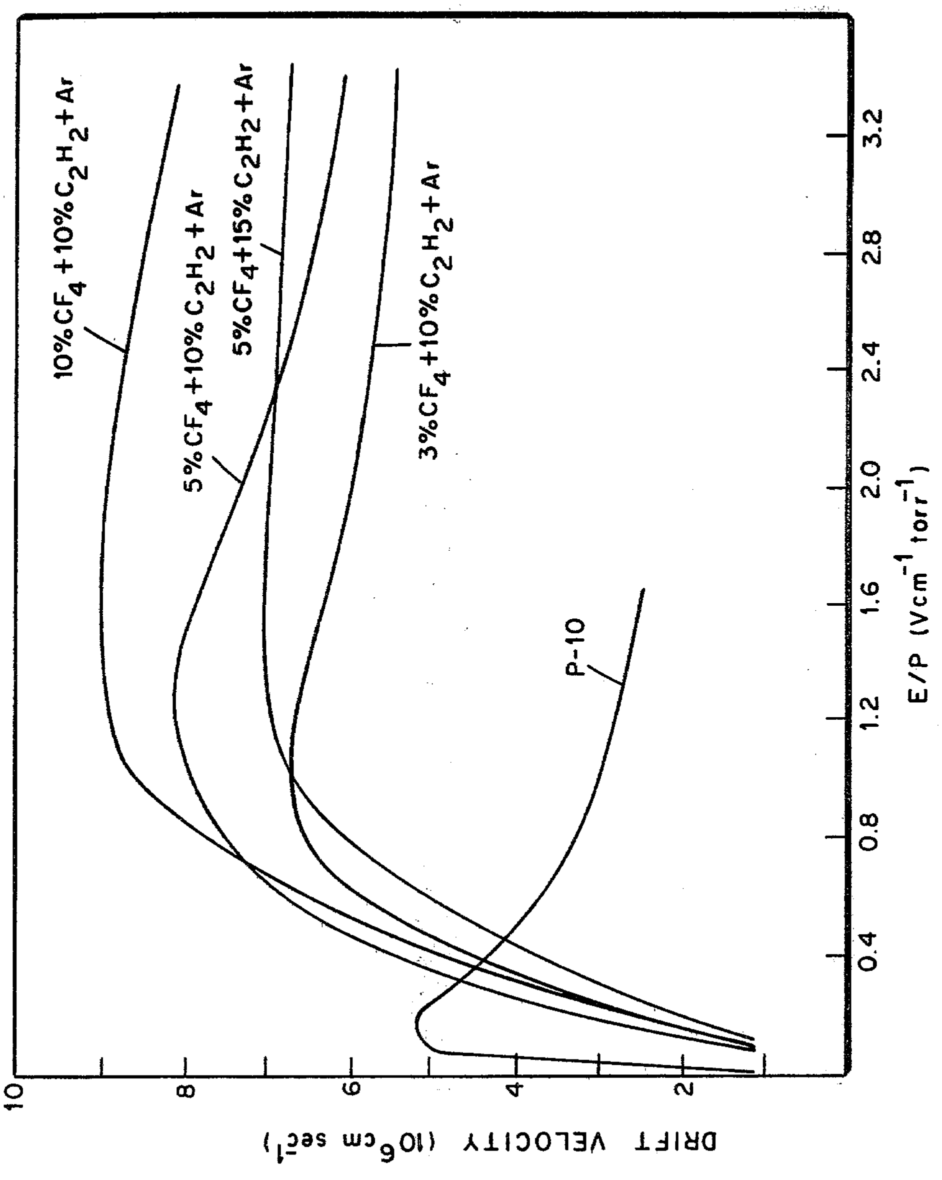
FIG. 3 is a similar plot comparing a P-10 mixture and Ar—$CF_4$—$C_2H_2$ mixtures.

The drift velocities for $C_2H_2$—$CF_4$—Ar mixtures are plotted in FIG. 3 as a function of E/P and are compared with those for P-10. The results plotted are for mixtures; 87% Ar-10% $C_2H_2$-3% $CF_4$; 85% Ar-10% $C_2H_2$-5% $CF_4$; 80% Ar-10% $C_2H_2$-10% $CF_4$ ; and 80% Ar-15% $C_2H_2$-5% $CF_4$. These ternary gas mixtures exhibit drift velocities up to twice that for P-10 and sustain this higher drift velocity over a large range of E/P. Additionally, the proportional counter energy resolution for these ternary mixtures is only slightly (4–8%) higher than that for P-10.

Figure 4:
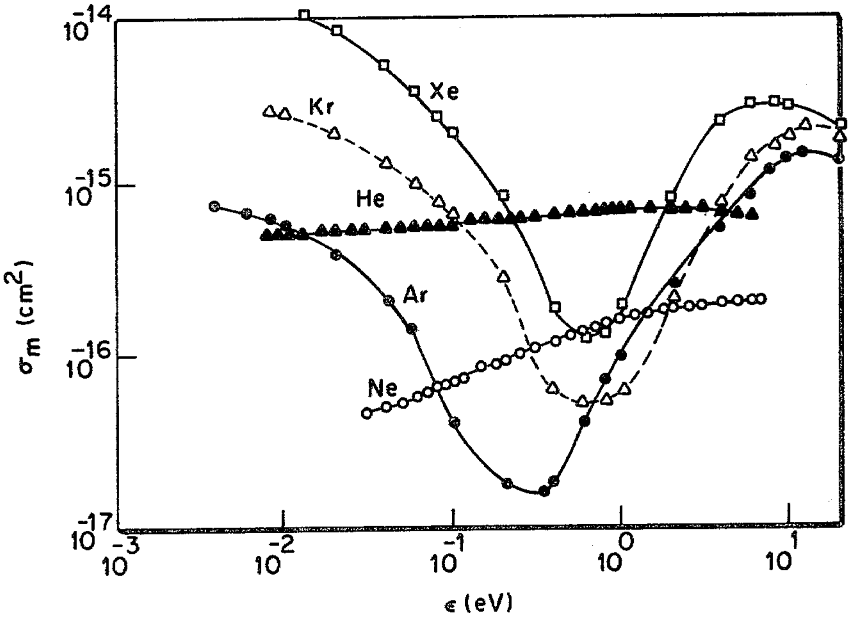
FIG. 4 is a plot of the momentum transfer cross sections, as a function of electron energy, for the noble gases.

Many applications of gas-filled detectors involve electromagnetic ionizing radiation such as X- and gamma-rays. In such cases it is desirable to use a noble gas having a high atomic number, Z, because the stopping power is strongly increased with increasing the atomic number of the counting gas. In the past, xenon (Z=54) or krypton (Z=36) have been utilized, often in combination with about 10 vol.% $CO_2$ or $CH_4$. As shown in FIG. 4, these gases exhibit minima in their momentum transfer cross section, $\sigma_m$ at about 1 eV electron energy. These are similar to, but larger than, the minimum for Ar. It may be seen in this figure that He and Ne do not exhibit minima in the same manner. Accordingly, various gas mixtures were prepared, based upon a major proportion of xenon, using the above-described molecular gases, $CF_4$ and $C_2H_2$. The temperature was 298 K, and the total pressure was 500 torr. The drift velocities of the gases were measured by conventional techniques, and compared with those for Xe—$CO_2$ and Xe—$CH_4$. The purities of the components were: Xe, 99.995%; $CF_4$, 99.7%; $C_2H_2$, 99.6%; $CO_2$, 99.99%; and $CH_4$, 99%.

Figure 5:
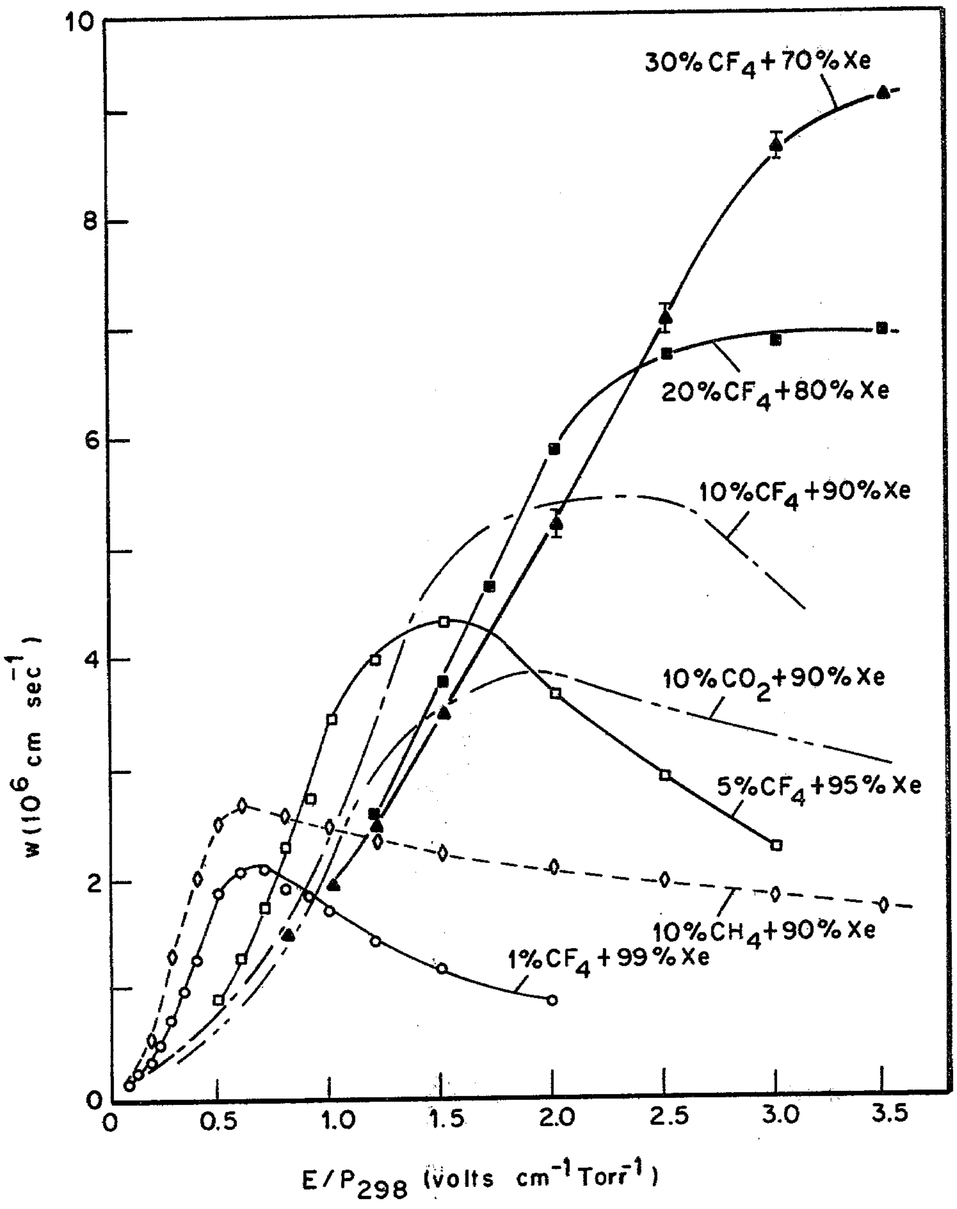
FIG. 5 is a plot of drift velocity as a function of E/P showing the superiority of Xe—$CF_4$ mixtures as an electromagnetic radiation detector counter gas.

The data for the binary system Xe—$CF_4$ are plotted in FIG. 5. For comparison, the data for two prior art binary mixtures, 10% $CH_4$—Xe and 10% $CO_2$—Xe are also plotted. From the data it may be seen that as little as 5% $CF_4$ in Xe provides a higher drift velocity than with 10% $CO_2$, and that increased amounts of $CF_4$ provide increased drift velocities over substantially wider ranges of E/P. The drift velocities for the 5% $CF_4$—Xe are superior to those of 10% $CH_4$—Xe at nearly all values of E/P. The results for 1% $CF_4$ are also shown.

Figure 6:
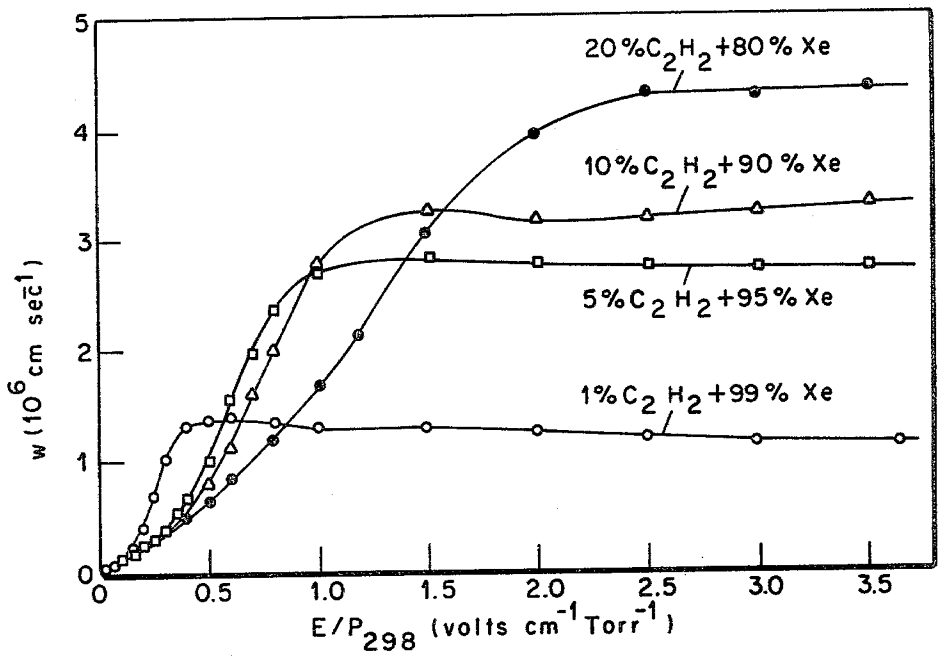
FIG. 6 is a similar plot for several $C_2H_2$—Xe binary mixtures.

The addition of $C_2H_2$ to Xe results in a characteristic similar to the addition of $C_2H_2$ to Ar as described above. The data, as plotted in FIG. 6, exhibits a flat drift velocity response over a very wide range of E/P. This permits adjusting a system over wide voltage and pressure parameters. The drift velocities of 10% $C_2H_2$—Xe, above about E/P=1, volt $cm^{-1}$ $torr^{-1}$ are nearly as large as the highest value for 10% $CO_2$—Xe (See FIG. 5).

Figure 7:
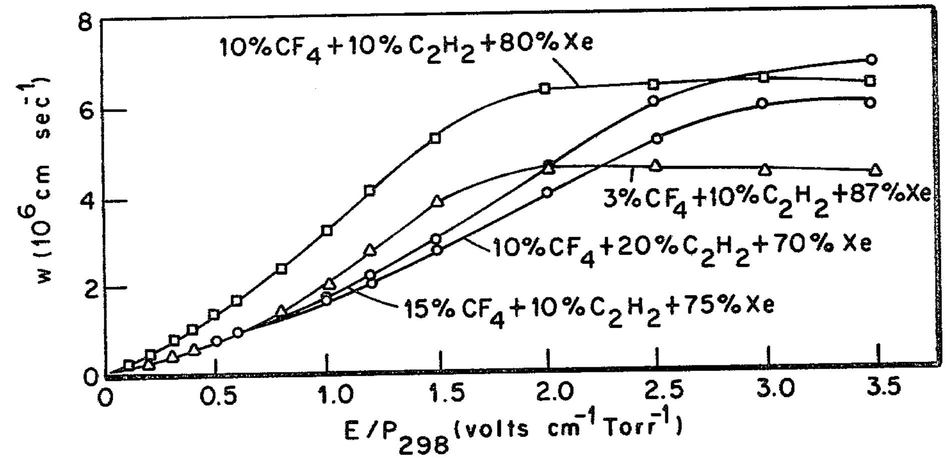
FIG. 7 is a similar plot for several $C_2H_2$—$CF_4$—Xe ternary mixtures.

A ternary gas mixture of $CF_4$—$C_2H_2$—Xe was tested for drift velocity. The data are plotted in FIG. 7. A composition of 10% $CF_4$-10% $C_2H_2$—Xe exhibits a rather fast rise in drift velocity as E/P increases to a value of about 2 volts $cm^{-1}$ $torr^{-1}$, and the drift velocity remains substantially constant for higher E/P values. A desired response of a detector may be provided by a proper selection of the gas components, and the voltage and pressure parameters.

Figure 8:
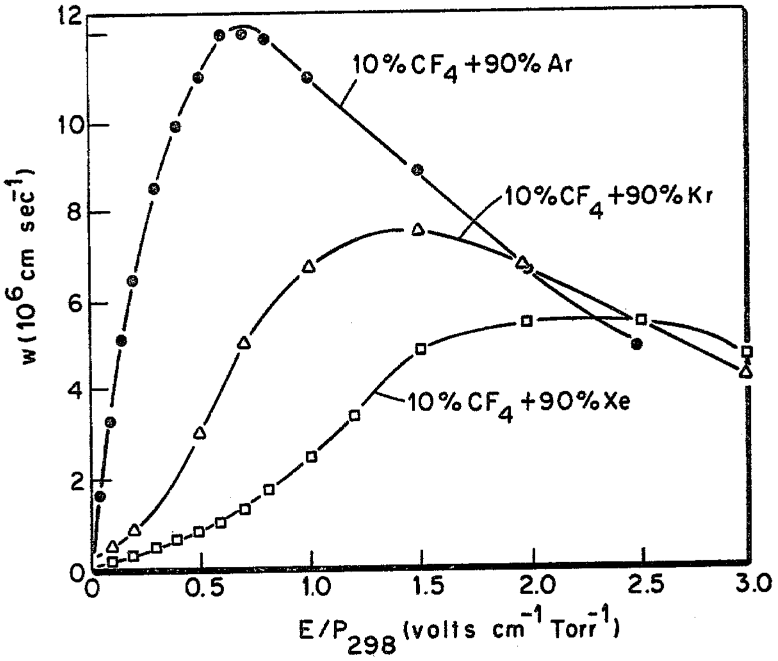
FIG. 8 is a similar plot for 10% $CF_4$ added to several of the noble gases.

Krypton is occasionally used as the primary filling gas in gas-filled radiation detectors. Thus, the effect of the addition of $CF_4$ upon the drift velocity was investigated. The data for 10% $CF_4$—Kr are plotted in FIG. 8 where they are compared with those for 10% $CF_4$—Ar and 10% $C_2H_2$—Xe. The flattening of the curve, and the extension of high drift velocities to larger E/P values may be noted.

From the results illustrated in FIGS. 1–3 and 5–8, as discussed above, it can readily be seen that the drift velocity of various gas mixtures comprising appropriate noble gases and varying amounts of $CF_4$and/or $C_2H_2$, is substantially improved over that achieved by the prior art gas mixtures wherein the use of such improved gas mixtures in conventional radiation counters results in faster response thereof.

This invention has been described by way of illustration rather than by limitation and it should be apparent that it is equally applicable in fields other than those described. The true scope and spirit of the invention are indicated in the following claims.

What is claimed is:

1. A gas mixture for use in a gas-filled radiation detector, comprising $CF_4$, $C_2H_2$ and a gas selected from the group consisting of argon, krypton and xenon, with the concentration of said $CF_4$ in said mixture being in the range of about 3 to about 10 volume percent and the concentration of said $C_2H_2$ in said mixture being in the range of about 10 to about 15 volume percent.

* * * * *